United States Patent
Peker et al.

(10) Patent No.: US 7,406,123 B2
(45) Date of Patent: Jul. 29, 2008

(54) VISUAL COMPLEXITY MEASURE FOR PLAYING VIDEOS ADAPTIVELY

(75) Inventors: Kadir A. Peker, Winchester, MA (US); Ajay Divakaran, Burlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 767 days.

(21) Appl. No.: 10/616,546

(22) Filed: Jul. 10, 2003

(65) Prior Publication Data

US 2005/0018881 A1    Jan. 27, 2005

(51) Int. Cl.
*H04N 7/12* (2006.01)

(52) U.S. Cl. ............ 375/240.16; 375/240; 375/240.01; 375/240.12

(58) Field of Classification Search ................ 375/240, 375/240.01, 240.12, 240.16; 386/9; 345/421; 708/402
See application file for complete search history.

(56) References Cited

U.S. PATENT DOCUMENTS

| | | | | |
|---|---|---|---|---|
| 5,528,533 | A * | 6/1996 | Kitaura et al. | 708/402 |
| 5,596,418 | A * | 1/1997 | Strolle et al. | 386/9 |
| 5,596,685 | A * | 1/1997 | Ashton | 345/421 |
| 6,181,742 | B1 * | 1/2001 | Rajagopalan et al. | 375/240 |
| 2003/0026340 | A1 | 2/2003 | Divakaran et al. | 375/240.16 |

OTHER PUBLICATIONS

Meng et al., "Scene Change Detection in a MPEG Compressed Video Sequence", Proceedings of the SPIE, vol. 2419, p. 14-25, 1995.*
Meng et al., "Scene Change Detection in a MPEG Compressed Video Sequence," Proceedings of the SPIE, vol. 2419, p. 14-25, 1995.
Peker, "Video Indexing and Summerization Using Motion Activity," dissertation, New Jersey Institute of Technology, Jan. 2001.
Peker et al., "An Extended Framework for Adaptive Playback-Based Video Summerization," SPIE Internet Multimedia Management Systems IV, vol. 5242, p. 26-33, 2003.
Zhang et al., "Video Parsing Using Compressed Data," Proceedings of the SPIE, vol. 2182, p. 142-149, 1994.
S. Pfeiffer et al. in "Abstracting Digital Movies Automatically," J. Visual Comm. Image Representation, vol. 7, No. 4, pp. 345-353, Dec. 1996.
Hanjalic et al. in "An Integrated Scheme for Automated Video Abstraction Based on Unsupervised Cluster-Validity Analysis," IEEE Trans. On Circuits and Systems for Video Technology, vol. 9, No. 8, Dec. 1999.

(Continued)

*Primary Examiner*—Allen Wong
(74) *Attorney, Agent, or Firm*—Dirk Brinkman; Clifton D. Mueller; Gene V. Vinokur

(57) ABSTRACT

A method plays frames of a video adaptively according to a visual complexity of the video. First a spatial frequency of pixel within frames of the video is measured, as well as a temporal velocity of corresponding pixels between frames of the video. The spatial frequency is multiplied by the temporal velocity to obtain a measure of the visual complexity of the frames of the video. The frames of the video are then played at a speed that corresponds to the visual complexity.

17 Claims, 13 Drawing Sheets

OTHER PUBLICATIONS

Yeung et al., "Efficient matching and clustering of video shots," ICIP '95, pp. 338-341, 1995.

Zhong et al., "Clustering methods for video browsing and annotation," SPIE Storage and Retrieval for Image and Video Databases IV, pp. 239-246, 1996.

Ferman et al., "Efficient filtering and clustering methods for temporal video segmentation and visual summarization," J. Vis. Commun. & Image Rep., 9:336-351, 1998.

DeMenthon et al., "Video Summarization by Curve Simplification," ACM Multimedia 98, pp. 211-218, Sep. 1998.

Divakaran et al., "Motion Activity based extraction of key frames from video shots," Proc. IEEE Int'l Conf. on Image Processing, Sep. 2002.

Ma et al., "A User Attention Model for Video Summarization," ACM Multimedia '02, pp. 533-542, Dec. 2002.

Divakaran et al., "Video summarization using descriptors of motion activity," Journal of Electronic Imaging, vol. 10, No. 4, Oct. 2001.

Peker et al., "Constant pace skimming and temporal sub-sampling of video using motion activity," Proc. IEEE Int'l Conf. on Image Processing, Oct. 2001.

Watson et al., "Window of Visibility: a psychophysical theory of fidelity in time-sampled visual motion displays," J. Opt. Soc. Am. A, vol. 3, No. 3, pp. 300-307, Mar. 1986.

Van Roosmalen et al. "Embedded Coring in MPEG Video Compression," IEEE Transactions on Circuits and Systems for Video Technology, vol. 12, No. 3, Mar. 2002.

\* cited by examiner

VISUAL COMPLEXITY MEASURE FOR PLAYING VIDEOS ADAPTIVELY

FIELD OF THE INVENTION

This invention relates generally to processing videos, and more particularly to adaptively playing compressed videos based on visual complexity.

BACKGROUND OF THE INVENTION

In the prior art, video summarization and adaptive playback of videos are often perceived as one and the same. Therefore, to distinguish the invention, the following definitions are provided.

Video Summarization

Video summarization is a process that generates the gist or main points of video content in a reduced and compact form. In general, video summaries are generated by selecting a subset of frames from the original video to produce a summary video that is shorter video than the original video. A summary can include selected still frames and/or short selected continuous sequences to convey the essence of the original video. The summary can be presented in the order of the selected frames, as a story board, or as a mosaic. It is also possible to summarize a video textually or verbally.

In general, video summarization is based on user input and video content. The analysis of the content can be based on low-level features such as texture, motion, color, contrast, luminance, etc., and high-level semantic features such genre, dramatic intensity, humor, action level, beauty, lyricism, etc.

Adaptive Playback

Adaptive playback is a process that presents a video in a time-warped manner. In the most general sense, the video play speed is selectively increased or decreased by changing the frame rate, or by selectively dropping frames to increase the play speed, or adding frames to decrease the play speed. If the adaptive playback of a video is shorter than the original video and the playback conveys the essence of the content of the video, then it can be considered as a type of summary. However, there are cases where the adaptive playback of a video is longer than the original video. For example, if the video contains a complex scene or a lot of motion, then playing the video at a slower speed can provide the viewer with a better sense of the details of the video. That type of adaptive playback is an amplification or augmentation of the video, rather than a summary.

The main purpose of a summary is to output the essence of the video in a shorter amount of time, and therefore the process is basically grounded on content analysis.

In contrast, the main purpose of adaptive playback is to improve the perception of the video to the human visual system, where the improvement is based on the video's visual complexity. Therefore, the focus of the adaptation is based more on psycho-physical characteristics of the video rather than content, and the process is more of a presentation technique, than a content analysis method.

Automatic video summarization methods are well known, see S. Pfeiffer et al. in "Abstracting Digital Movies Automatically," J. Visual Comm. Image Representation, vol. 7, no. 4, pp. 345-353, December 1996, and Hanjalic et al. in "An Integrated Scheme for Automated Video Abstraction Based on Unsupervised Cluster-Validity Analysis," IEEE Trans. On Circuits and Systems for Video Technology, Vol. 9, No. 8, December 1999.

Most known video summarization methods focus on color-based summarization. Pfeiffer et al. also uses motion, in combination with other features, to generate video summaries. However, their approach merely uses a weighted combination that overlooks possible correlation between the combined features. While color descriptors are reliable, they do not include the motion characteristics of video content. However, motion descriptors tend to be more sensitive to noise than color descriptors. The level of motion activity in a video can be a measure of how much the scene acquired by the video is changing. Therefore, the motion activity can be considered a measure of the "summarizability" of the video. For instance, a high speed car chase will certainly have many more "changes" in it compared to a scene of a news-caster, and thus, the high speed car chase scene will require more resources for a visual summary than would the news-caster scene.

In some sense, summarization can be viewed as a reduction in redundancy. This can be done by clustering similar video frames, and selecting representative frames from the from clusters, see Yeung et al., "Efficient matching and clustering of video shots," ICIP '95, pp. 338-341, 1995, Zhong et al., "Clustering methods for video browsing and annotation," SPIE Storage and Retrieval for Image and Video Databases IV, pp. 239-246, 1996, and Ferman et al., "Efficient filtering and clustering methods for temporal video segmentation and visual summarization," J. Vis. Commun. & Image Rep., 9:336-351, 1998.

In another approach, changes in the video content are measured over time, and representative frames are then selected whenever the changes become significant, see DeMenthon et al., "Video Summarization by Curve Simplification," ACM Multimedia 98, pp. 211-218, September 1998, and Divakaran et al., "Motion Activity based extraction of key frames from video shots," Proc. IEEE Int'l Conf. on Image Processing, September 2002.

In yet another approach, a significance measure is assigning to the different parts of the video. Subsequently, less significant parts can be filtered, see Ma et al., "A User Attention Model for Video Summarization," ACM Multimedia '02, pp. 533-542, December 2002.

An adaptive video summarization method is described by Divakaran et al., "Video summarization using descriptors of motion activity," Journal of Electronic Imaging, Vol. 10, No. 4, October 2001, and Peker et al., "Constant pace skimming and temporal sub-sampling of video using motion activity," Proc. IEEE Int'l Conf. on Image Processing, October 2001, U.S. patent application Ser. No. 09/715,639, filed by Peker et al., on Nov. 17, 2000, and U.S. patent application Ser. No. 09/654,364 filed Aug. 9, 2000 by Divakaran et al, incorporated herein by reference. There, a motion activity descriptor is used to generate a summary that has a constant 'pace'. The motion activity descriptor is an average magnitude of the motion vectors in an MPEG compressed video.

The prior art video processing methods have mainly focused on providing comprehensible summaries considering the content. However, different methods are required to adaptively play videos at different speeds according to visual complexity. These methods should consider how fast the human eye can follow the flow of action as a function of spatial and temporal complexity.

SUMMARY OF THE INVENTION

Psychophysical experiments have shown that the human visual system is sensitive to visual stimuli only within a certain spatio-temporal window. The location of a moving image in this spatio-temporal space is determined by the spatial frequency content of image regions and their velocities.

The invention provides a measure of spatio-temporal complexity (STC) in a video that can be used to determine how fast or slow the video should be played to match human perceptual limits. Alternatively, this measure enables one to determine the spatio-temporal filtering required for an acceptable playing speed of the video.

The spatio-temporal complexity is measured directly from the video so that the content can be played forward from any point. The adaptive playback method according to the invention is based on vision characteristics of the human visual system, and thus, the method is independent of content characteristics and semantics as would be required for video summaries.

Therefore, the method according to the invention can be applied to a wide range of videos independent of their content. In addition, the method can be used for low temporal summarization, where the perceived content and temporal continuity are preserved over time, and the risk of missing an important event is minimized.

Equipped with a measure of visual complexity of a video, the video can be played in two alternative ways. In one way, an optimal speed at which the video can be played is determined to maximize perception. In a second way, the visual complexity, which is partly a function of the spatial complexity, can be reduced by filtering high frequency spatial components and by spatio-temporal smoothing. Reducing the visual complexity does not mean that certain portions of the video are eliminated, as in the case of a summary, but rather that less time is required to convey the content through the human visual system, impendent of what that content is.

The visual complexity measure according to the invention does not imply any semantic inferences. The play speed is adapted to the low-level physical characteristics of the content, rather than to the high-level cognitive stages. In this aspect, the adaptive playback is more a presentation method than a semantic content analysis. Hence, the adaptive playback according to the invention is complimentary to known summarization methods.

Although the preferred embodiment of the invention operates on video that are compressed spatially by discrete cosine coefficients, and temporally by motion vector, it should be understood that the invention can also operate on uncompressed videos.

DETAILED DESCRIPTION OF THE PREFERRED EMBODIMENT

Our invention adaptively plays a video at a speed adjusted for acceptable comprehension of its content, independent of what that content is. Our play speed is primarily a function of scene complexity and the processing capacity of the human visual system. These factors greatly affect the frame processing time of the human visual system.

It is known that the human visual system is sensitive to stimuli only in a certain spatio-temporal window, see FIG. 6 below, called the window of visibility, see Watson et al., "Window of Visibility: a psychophysical theory of fidelity in time-sampled visual motion displays," J. Opt. Soc. Am. A, Vol. 3, No. 3, pp. 300-307, March 1986. Watson et al. state that for a time sampled video to be perceived the same as its continuous version, the two version should look the same within the window of visibility, in a transformed domain.

We also recognize that humans cannot view and comprehend beyond a certain spatial resolution and temporal frequency limit. Therefore, we balance the relationship between the spatial bandwidth and the velocity of the visual stimuli, i.e., the rate at which frames of the video are presented, to maintain a constant perceived visual quality when playing videos.

Figure 1:
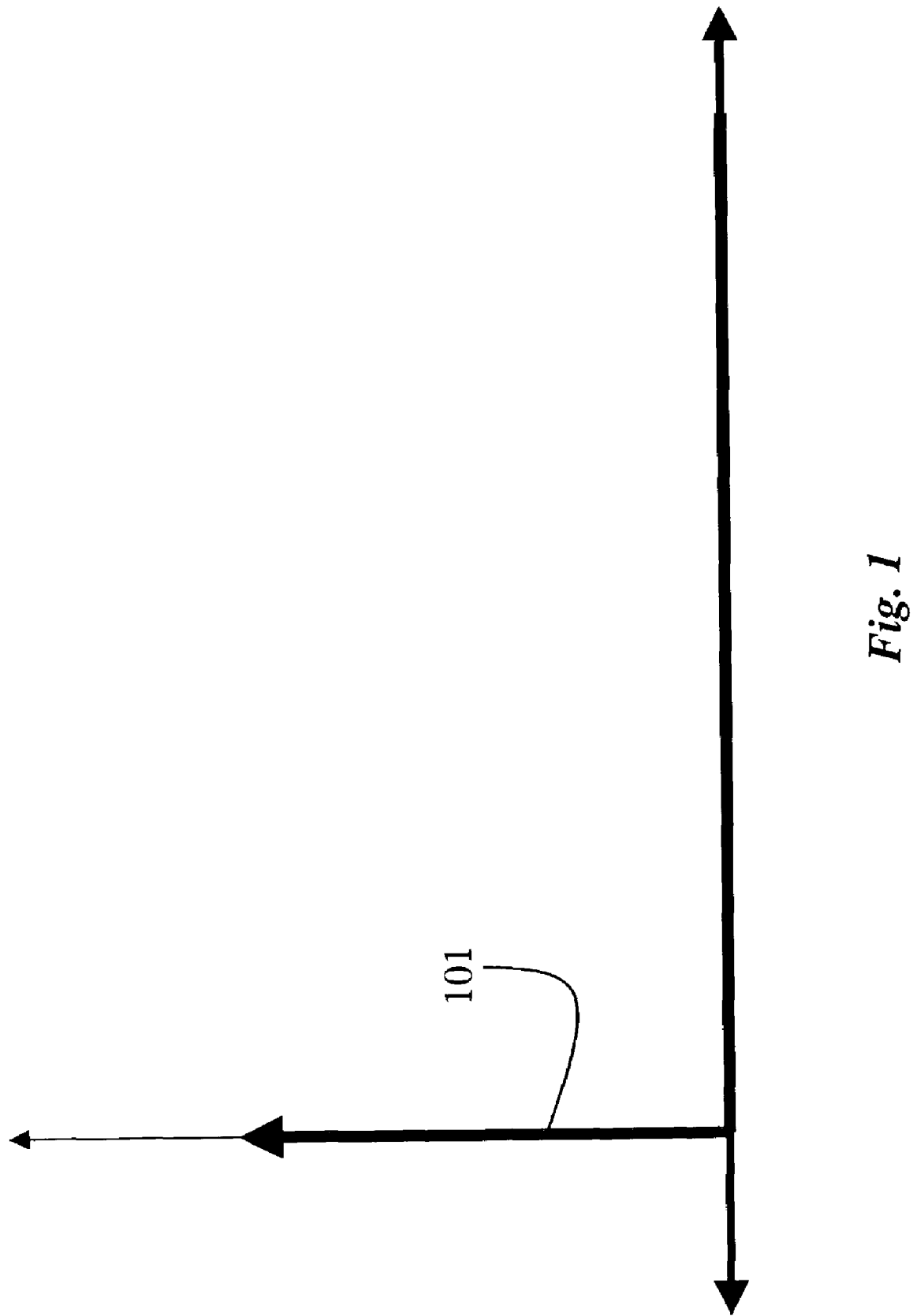
FIG. 1 is diagram of a 1-D impulse moving linearly.
Figure 2:
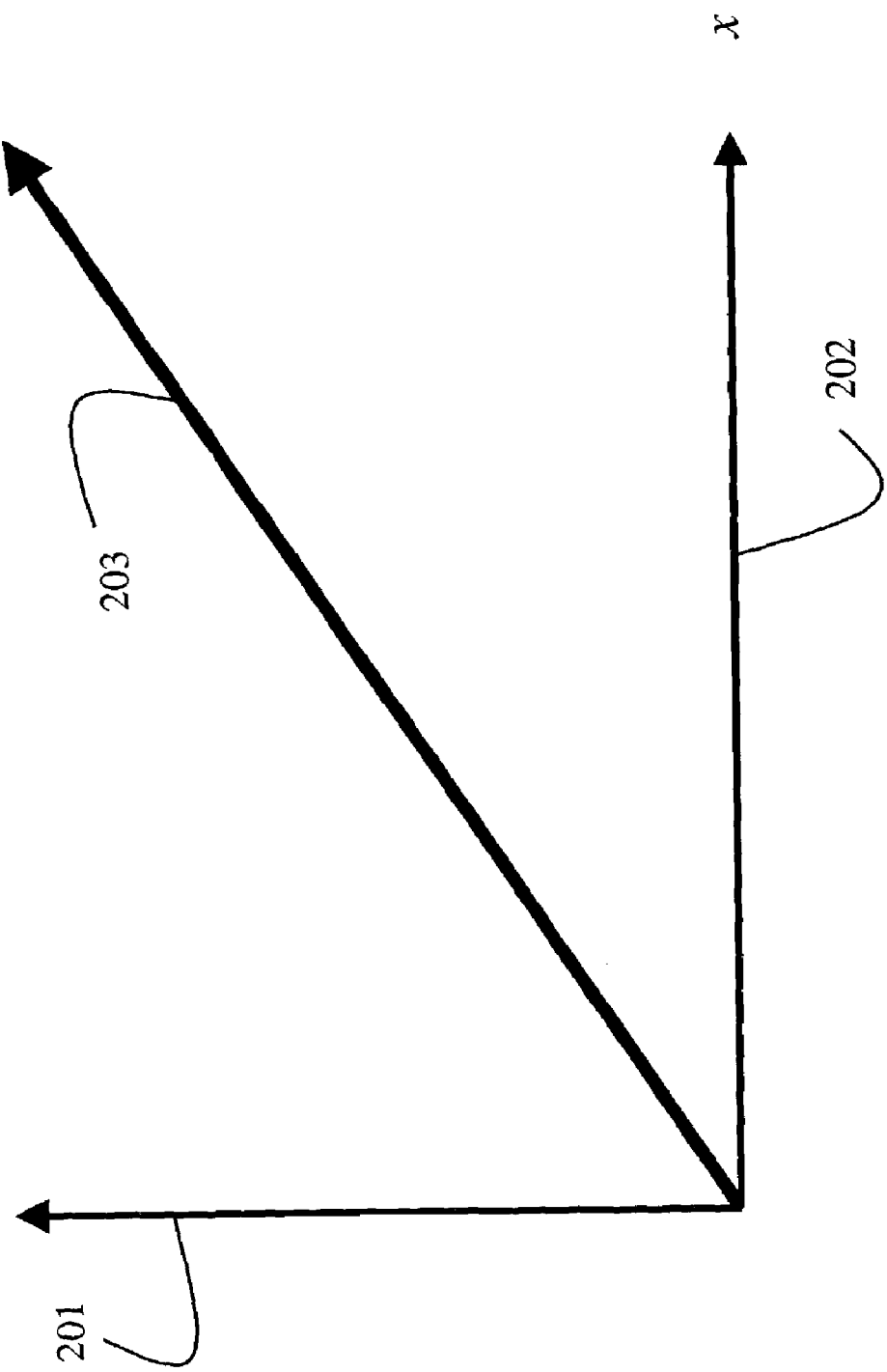
FIG. 2 is a timing diagram of the impulse of FIG. 1.
Figure 3:
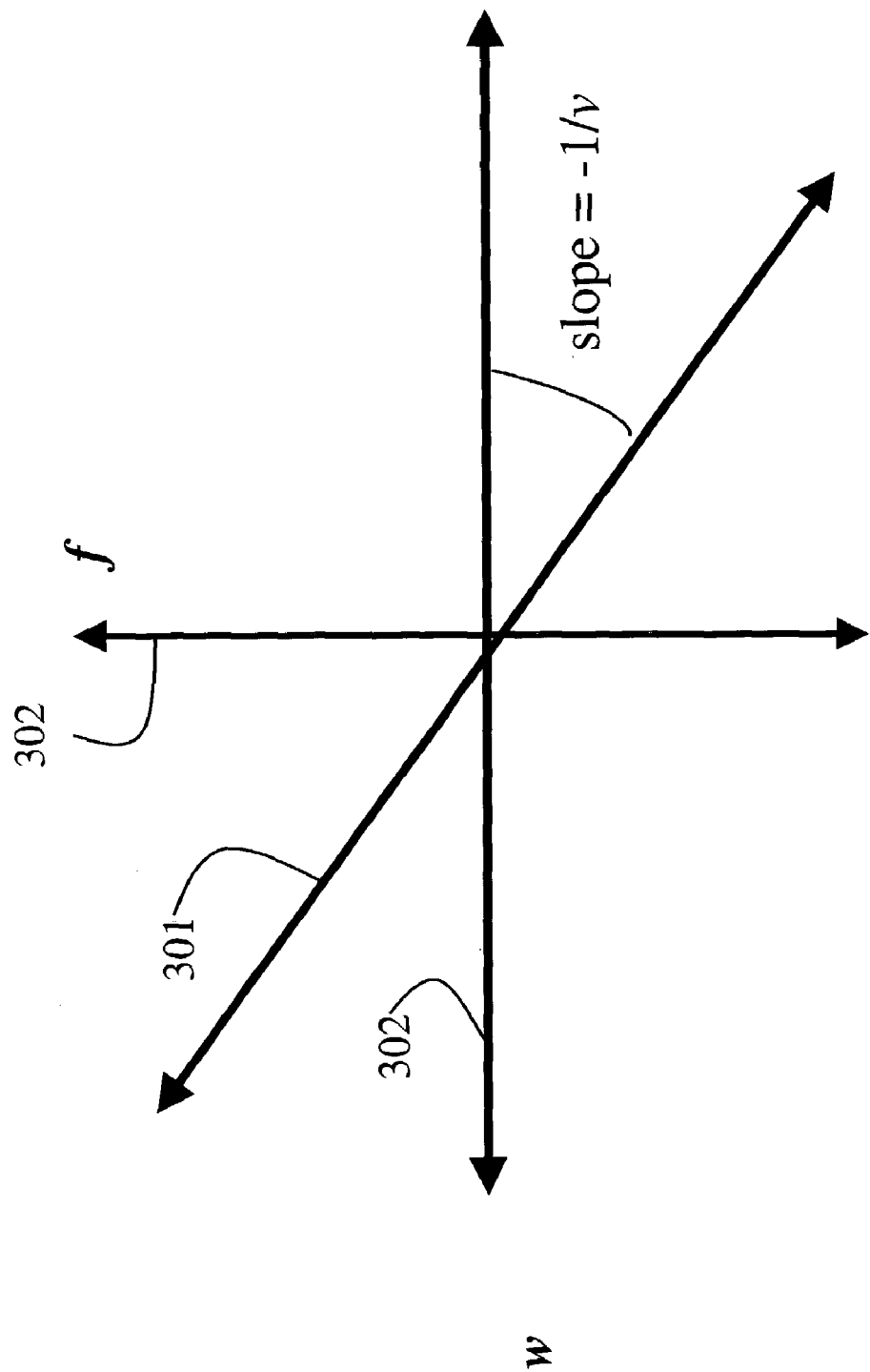
FIG. 3 is a Fourier transform of the signal of FIG. 1.

FIG. 1 illustrates this concept with a 1-D impulse signal 101 moving linearly left-to-right at velocity v, such that x=v.t, see FIG. 2 where the x and t axes are respectively labeled 201-202. This corresponds to a line 203 in the x-t space. As shown in FIG. 3, the Fourier transform of this signal is also a line 301 passing through the origin, with slope $$-\frac{1}{v},$$

where w 302 is the temporal frequency, and f 303 is the spatial frequency. In time, a 1-D signal translation has its spectrum lying on a line passing through the origin.

Figure 4:
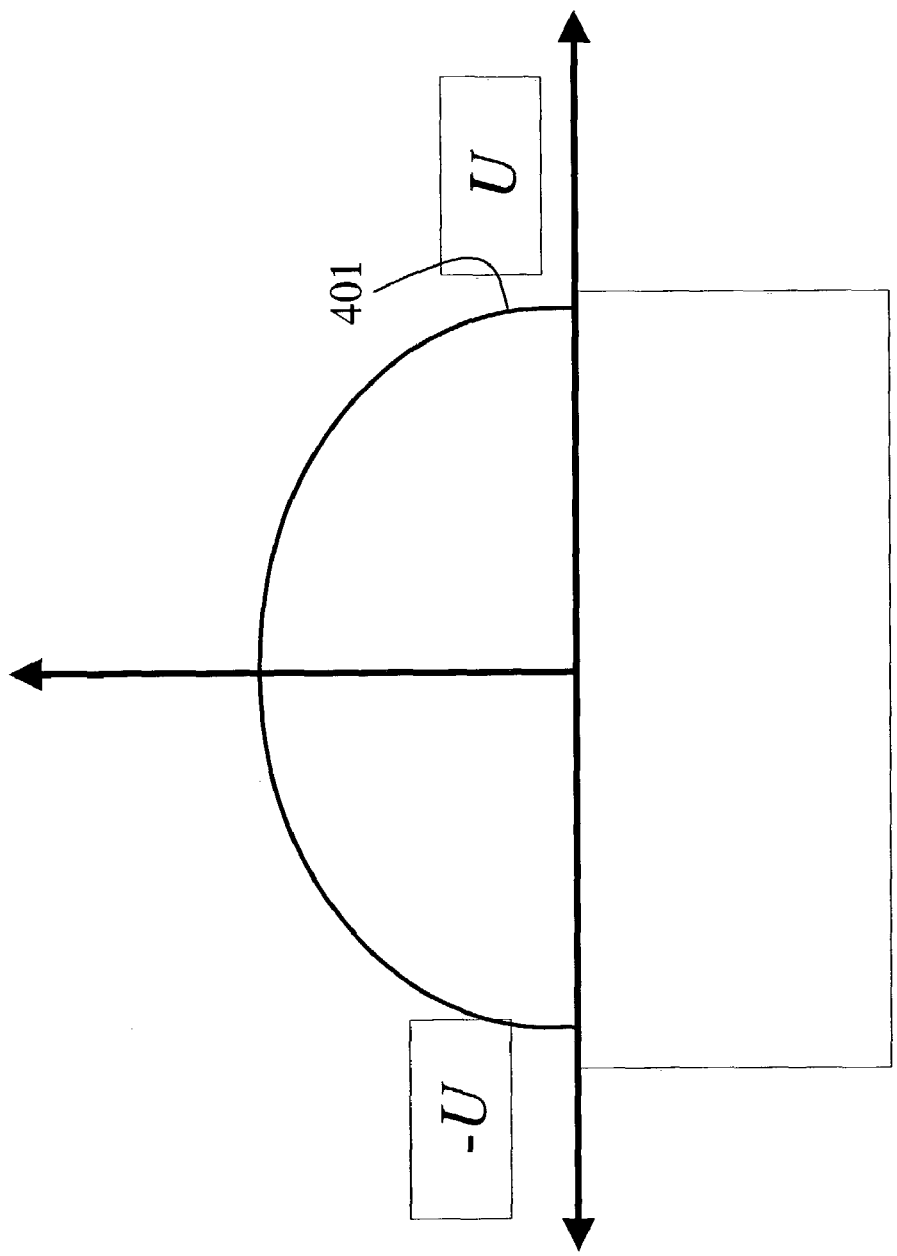
FIG. 4 is a diagram of a bandwidth limited signal.
Figure 5:
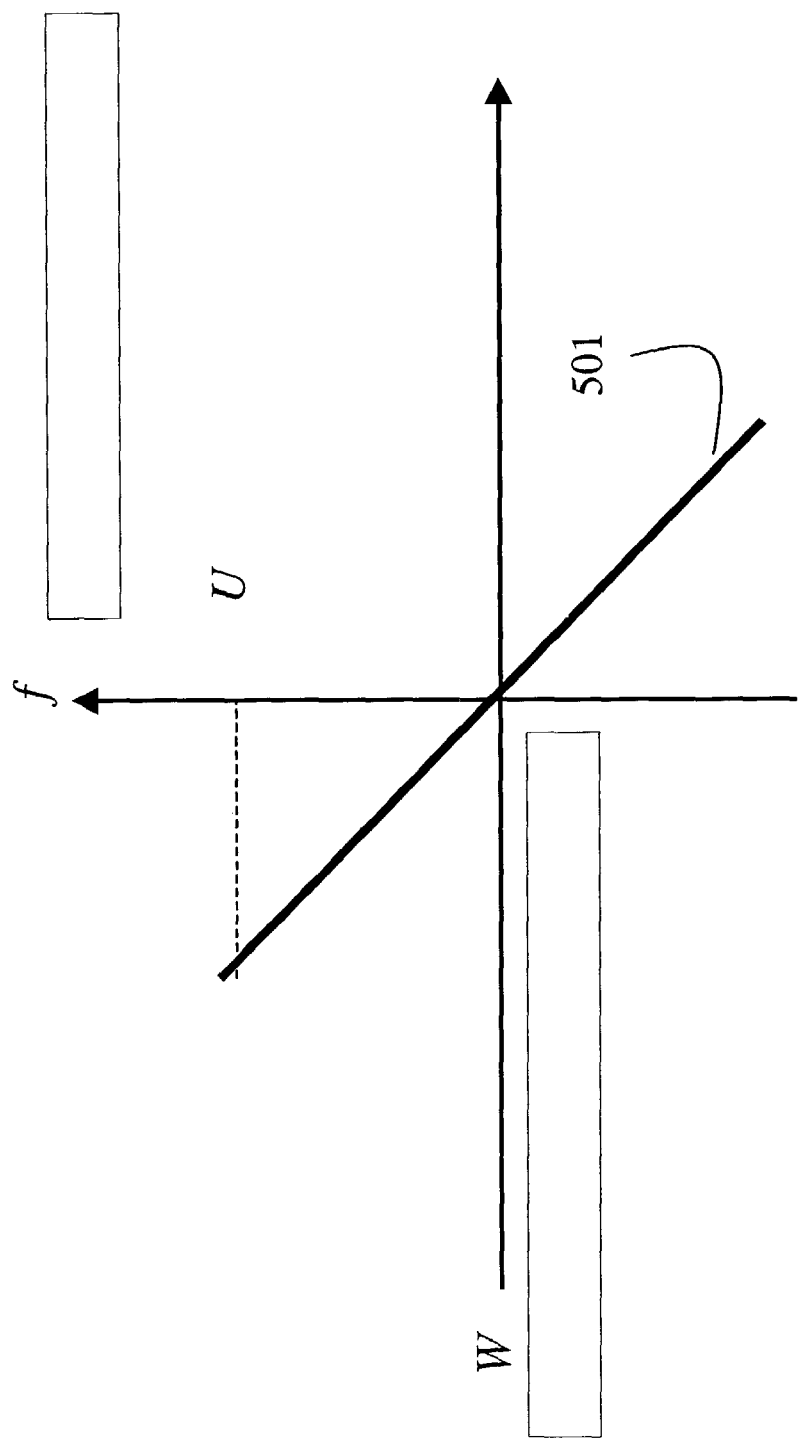
FIG. 5 is a Fourier transform of the signal of FIG. 4.

FIG. 4 shows a band-limited signal with a bandwidth of (−U, U) 401. As shown in FIG. 5 the spatio-temporal (Fourier) transform is a line 501 extending from (U, −v.U) to (−U, −v.U).

When a moving signal is sampled in time, replicas of the Fourier transform of the original signal are generated on the temporal frequency axis ω in the transform domain, each of which is $\omega_s$ apart, where $\omega_s$ is the temporal sampling frequency.

Figure 6:
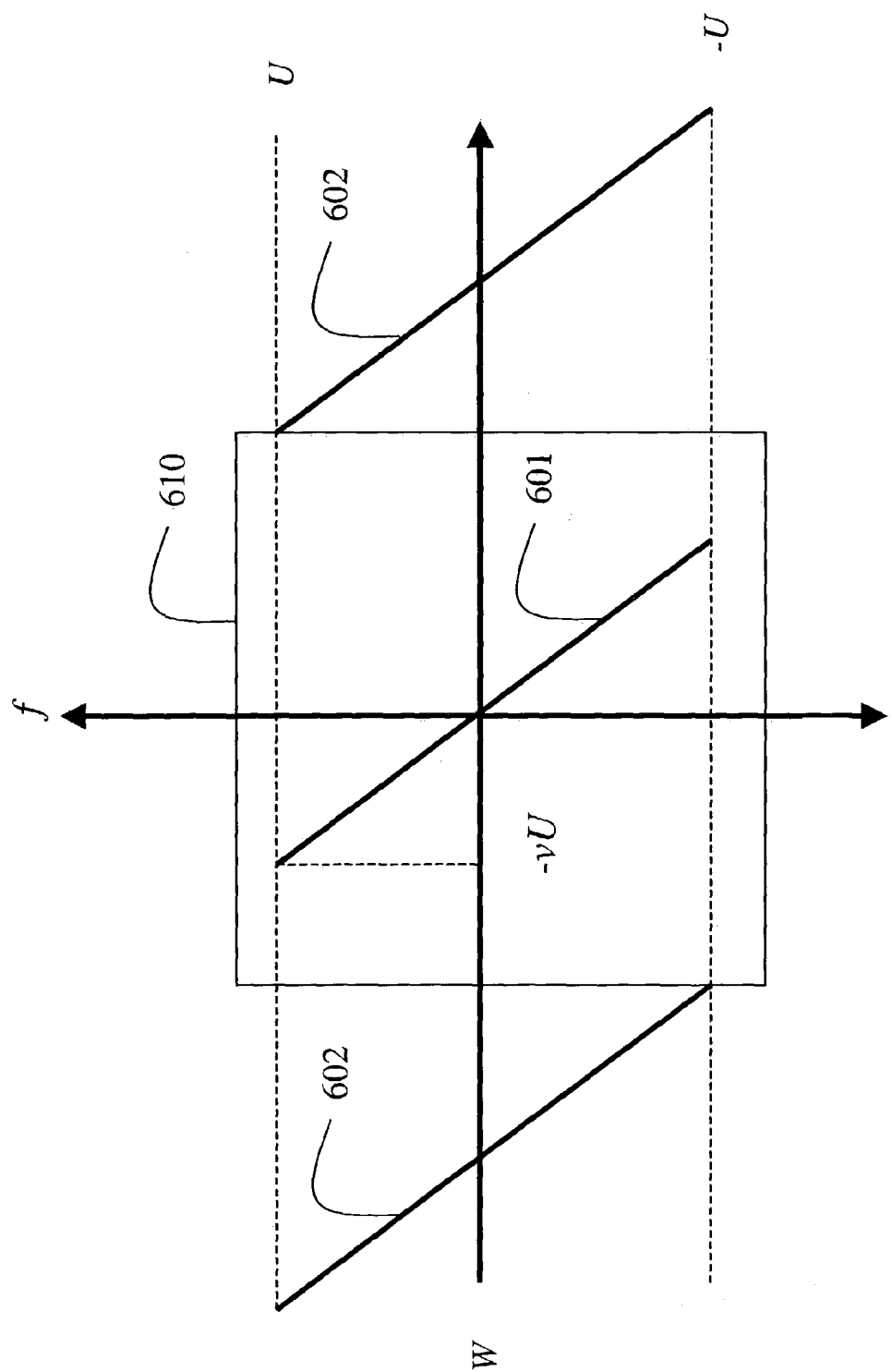
FIG. 6 is a diagram of a visibility window for the signal of FIG. 5.

According to pschychophysical theories, as shown in FIG. 6 for the Fourier domain, a temporally sampled bandwidth-limited signal 601 is perceived the same as a continuous version, as long as the sampled replicas 602 lie outside a window 610 of visibility, and Watson et al. The replicas 602 lie outside the window of visibility as long as $\omega_s \geq \omega_l \geq +vU$, where l is an edge of the window of visibility on the temporal frequency axis.

Figure 7:
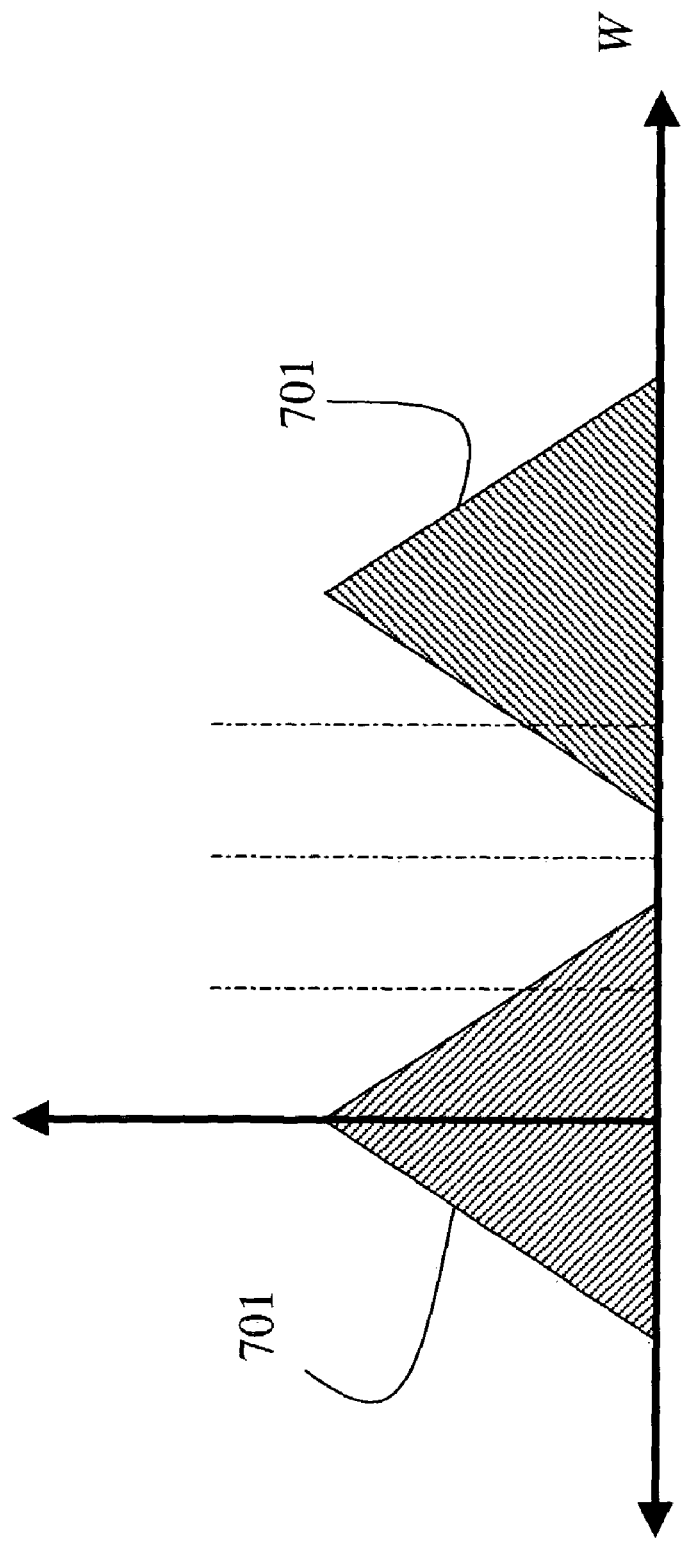
FIGS. 7 and 8 compare aliasing and window of visibility constraints.
Figure 8:
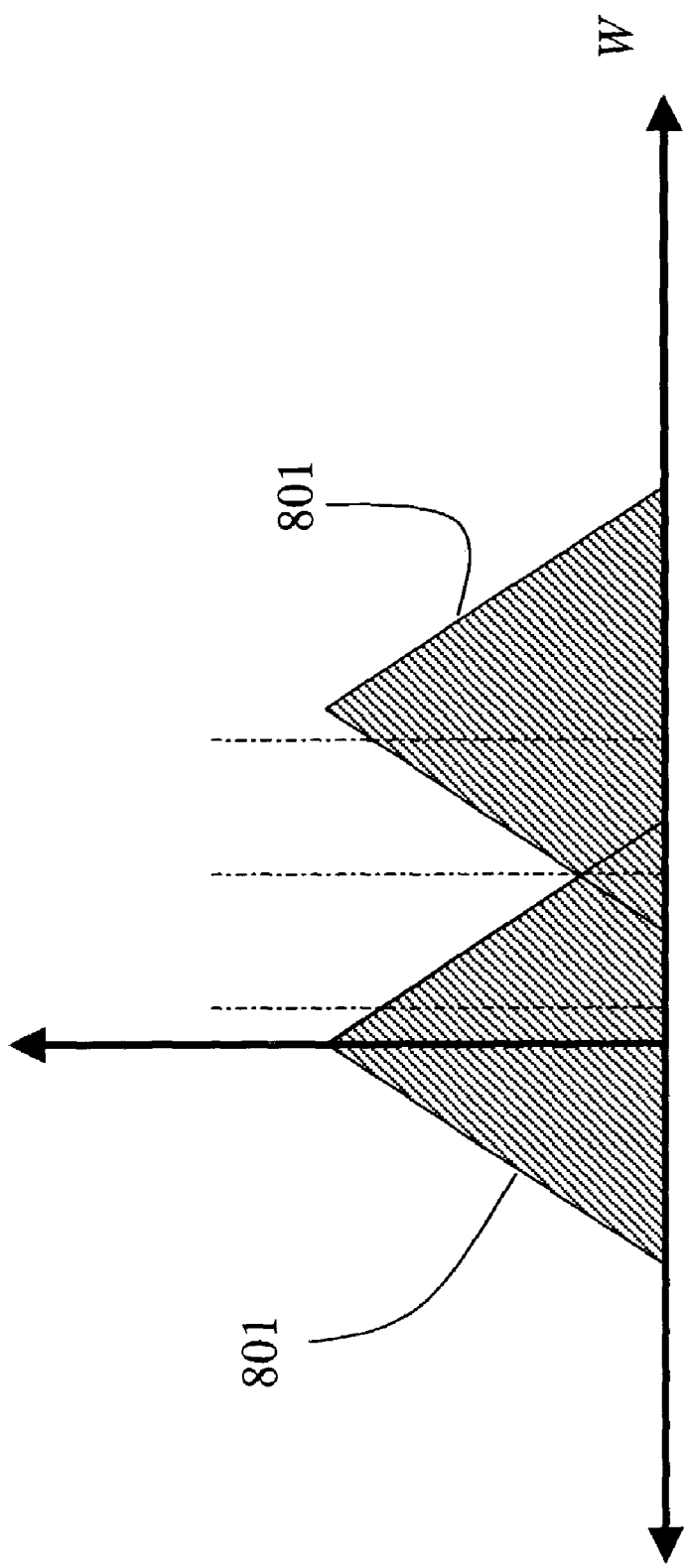

Another consideration is temporal aliasing effects due to sampling. The sampling frequency $\omega_s$ has to be at least 2.v.U to avoid aliasing. A comparison of the aliasing and the window of visibility constraints are illustrated in FIGS. 7 and 8 having temporal spectrums 701 and 801 for the sampled signals. In computer graphics, aliasing is frequently handled using spatial smoothing or motion blur. Therefore, the temporal bandwidth of the visual stimuli is the limiting factor on the temporal sampling frequency.

Figure 9:
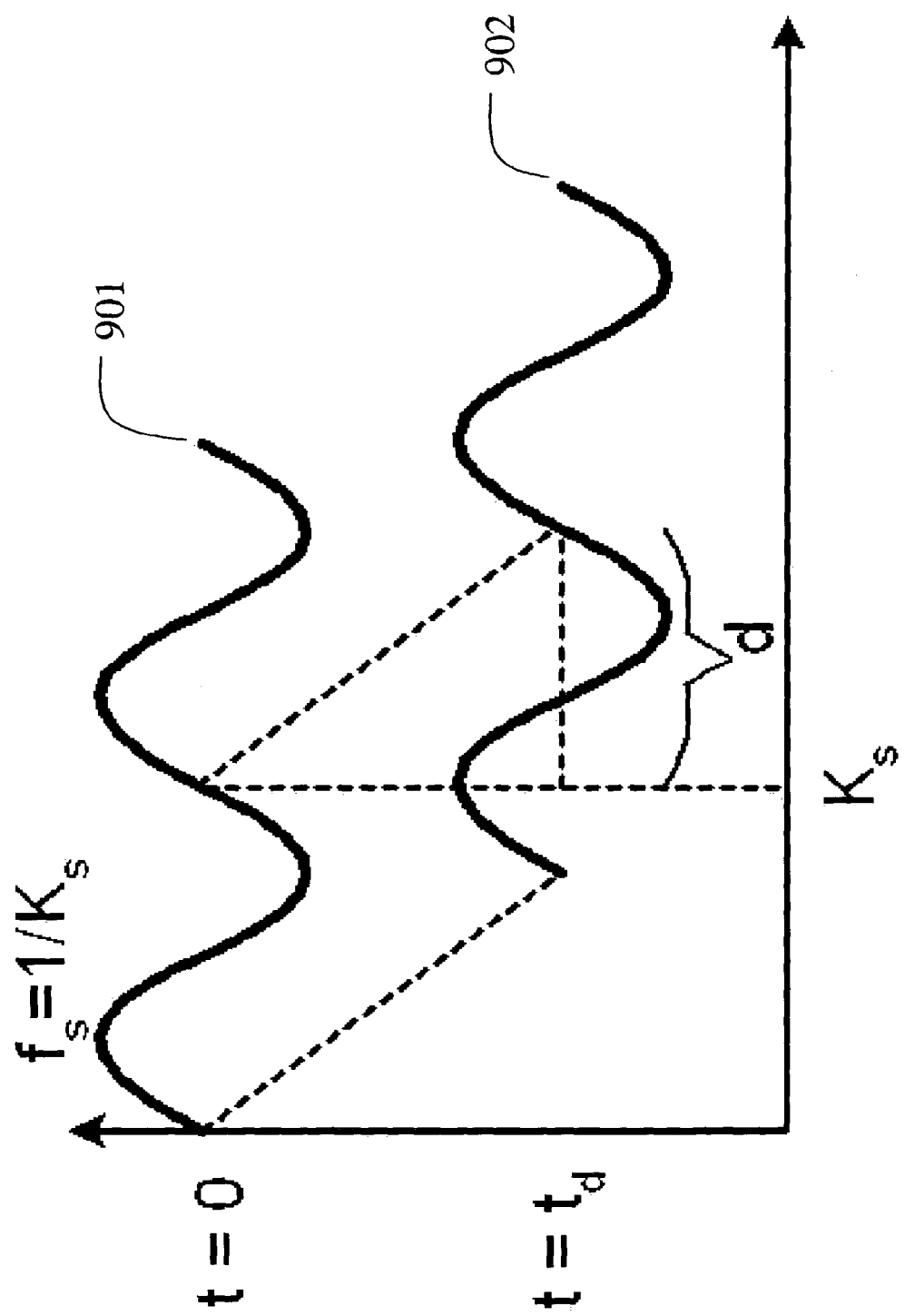
FIG. 9 is a diagram of a temporal bandwidth for translating a 1-D sinusoidal signal and a derivation of its temporal frequency.

As shown in FIG. 9 for a 1-D sinusoid 901 and its displace version 902, the temporal bandwidth for translating a 1-D signal is v.U., In the 2D case, the temporal frequency of a moving sinusoid is given by the dot product of the frequency vector and the velocity vector $$\varpi = \frac{\frac{d}{K_s} \text{cycles}}{t_d} = v \cdot f,$$

where $v=d/t_d$, and d is the relative displacement distance.

Figure 10:
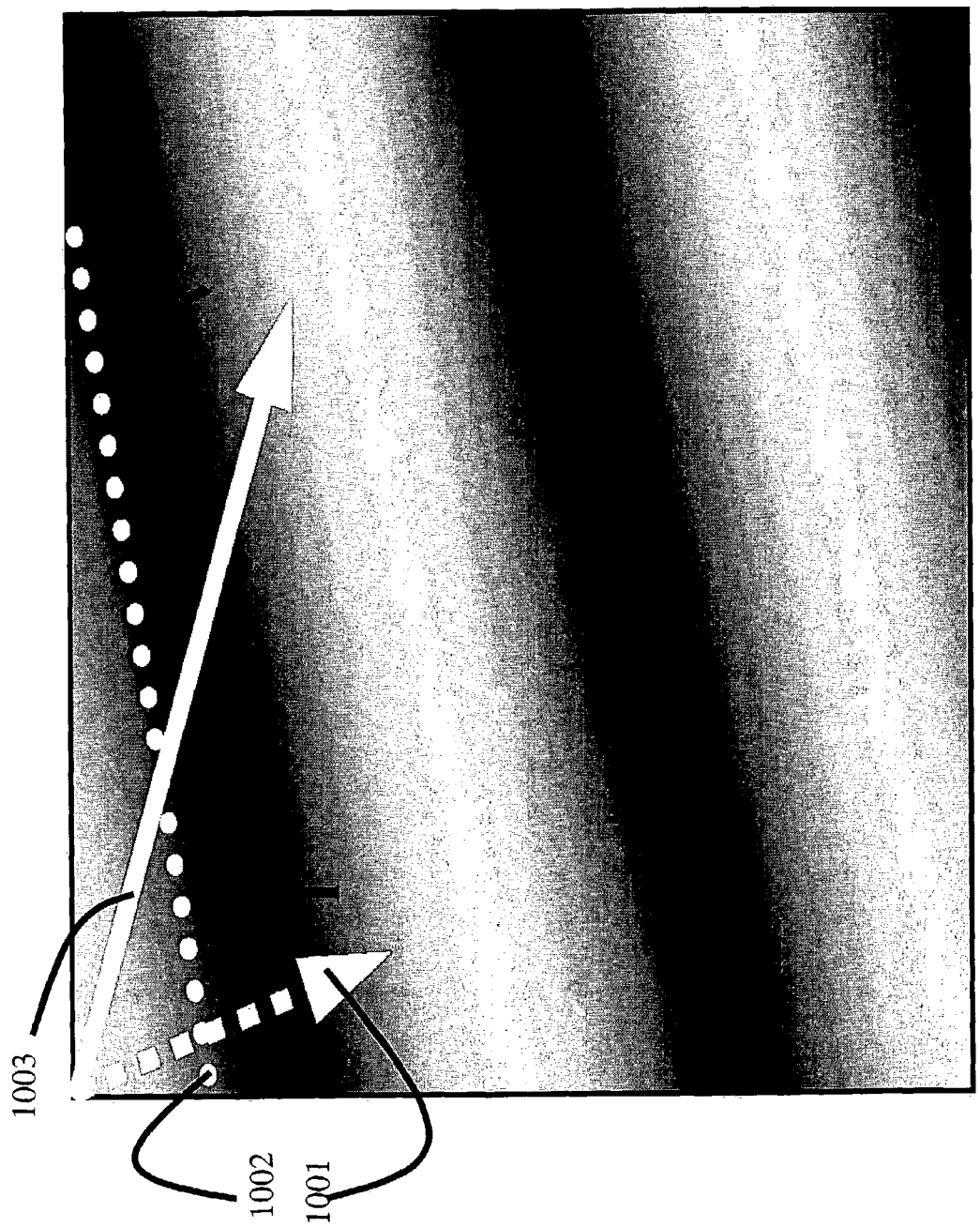
FIG. 10 is a diagram of a 2D sinusoid with a frequency vector perpendicular to a wave front.

FIG. 10 shows a 2D sinusoid with a frequency vector f 1001 perpendicular to a wave front 1002. A vector v 1003 shows a translation of the velocity. In FIG. 10, the sinusoid is cos $$\left(2\pi \frac{1}{N} x + 2\pi \frac{4}{N} y\right),$$

where the origin is at the upper left corner, and a positive y-axis is shown downward. Each 1-D cross-section of the 2D sinusoid is a 1-D sinusoid. The frequency of the sinusoid along the x-axis is $f_x=\frac{1}{2}$, and the frequency along the y-axis is $f_y=2$. We represent this sinusoid with a frequency vector $\vec{f}=(0.5, 2)$, which points in a highest frequency direction, i.e., along the gradient.

If the motion vector describing the translation of this sinusoid is given $\vec{v}=(v_x, v_y)$, then the spatial frequency of the 1-D cross-section in the spatial direction of the motion vector $\vec{v}$ is $$f_v = \frac{(f_x \cdot v_x + f_y \cdot v_y)}{\sqrt{v_x^2 + v_y^2}} = \frac{\vec{f} \cdot \vec{v}}{|\vec{v}|}.$$

Hence, the temporal frequency of a translating 2D signal with spatial frequency $\vec{f}$ and velocity $\vec{v}$ is given by $f_v|\vec{v}|= \vec{f} \cdot \vec{v}$.

We define this scalar product as the spatio-temporal or visual complexity measure according to the invention.

Spatio-Temporal Complexity in Compressed Videos

Methods that operate in compressed videos are advantageous because of substantial savings in processing time, and buffering and storage requirements. In many applications, processes that operate on compressed videos are the only viable solution. In order to measure the visual complexity according to the invention in compressed videos, we used macro-blocks of discrete cosine transformation (DCT) coefficients and motion vectors.

As described, our visual complexity is given by $\vec{f} \cdot \vec{v}$. The basis functions of the DCT transformation are in a form $$\cos\left(\frac{\pi k_x(2x+1)}{2N}\right) \cdot \cos\left(\frac{\pi k_y(2y+1)}{2N}\right) =$$

-continued $$\cos\left(2\pi \frac{k_x}{2N} x + 2\pi \frac{k_x}{4N}\right) \cdot \cos\left(2\pi \frac{k_y}{2N} y + 2\pi \frac{k_y}{4N}\right),$$

which is the multiplication of two 1-D sinusoids with frequencies $$\frac{k_x}{2} \text{ and } \frac{k_y}{2}$$

with a frequency $f_x$ in the x direction and frequency $f_y$ in the y direction is represented as $$\cos\left(2\pi \frac{f_x}{N} x + 2\pi \frac{f_y}{N} y\right).$$

Using an identity $$\cos(a \cdot b) = \frac{1}{2}[\cos(a+b) + \cos(a-b)]$$

we can write the DCT basis as $$\cos\left(2\pi \frac{k_x}{2N} x + 2\pi \frac{k_x}{4N}\right) \cdot \cos\left(2\pi \frac{k_y}{2N} y + 2\pi \frac{k_y}{4N}\right) =$$

$$\frac{1}{2}\left[\begin{array}{l}\cos\left(2\pi \frac{k_x}{2N} x + 2\pi \frac{k_y}{2N} y + 2\pi \frac{k_x+k_y}{4N}\right) + \\ \cos\left(2\pi \frac{k_x}{2N} x - 2\pi \frac{k_y}{2N} y + 2\pi \frac{k_x-k_y}{4N}\right)\end{array}\right].$$

Thus, each DCT basis is a superimposition of two 2D sinusoids, one with spatial frequency $$\vec{f}_1 = \left(\frac{k_x}{2}, \frac{k_y}{2}\right)$$

and the other with $$\vec{f}_2 = \left(\frac{k_x}{2}, \frac{k_y}{2}\right).$$

Then, the temporal frequencies or the spatio-temporal complexity resulting from the $(k_x, k_y)$ DCT coefficient and a motion vector $\vec{v}=(v_x, v_y)$ are $$\omega_1 = \vec{f}_1 \cdot \vec{v}_1 = \frac{k_x}{2} v_x + \frac{k_y}{2} v_y, \text{ and } \omega_2 = \vec{f}_2 \cdot \vec{v}_2 = \frac{k_x}{2} v_x \frac{k_y}{2} v_y,$$

which are in cycles-per-block units because $(k_x, k_y)$ have those units. To convert the frequency into cycles-per-frame, we convert $(k_x, k_y)$ into cycles-per-pixel by dividing by the macro-block size, e.g., 8. In addition, we use the absolute values $|\omega_1|$ and $|\omega_2|$ in process because the sign of the frequency is irrelevant in one dimension. The ½ factor used to expand the DCT to the sum of sinusoids is also irrelevant because all the terms have the same factor. Hence, the final form of the spatio-temporal complexity terms contributed by each DCT coefficient is $$\omega_1 = \frac{|k_x v_x + k_y v_y|}{16}, \omega_2 = \frac{|k_x v_x - k_y v_y|}{16}$$

cycles/frame.

Each DCT coefficient contributes a value equal to its energy to histogram bins corresponding to $\omega_1$ and $\omega_2$ in a spatio-temporal complexity histogram, as described below.

Motion Vector and DCT Estimation

In MPEG-videos, compressed motion vectors are determined to maximize compression efficiency. Because the motion vectors do not predict real motion, the motion vectors are unreliable. Spurious vectors are common especially when the encoder is not optimized. In order to reduce spurious motion vectors, we discard blocks with low texture because the block matching, which is used in finding the motion vectors, is less reliable for those blocks.

We discard by thresholding the spatial bandwidth of each block, which we already determine for the visual complexity measure. Note that blocks with a low texture or low spatial bandwidth are expected to have a low visual complexity. Hence, the risk of losing significant blocks is minimal. Then, we apply median filtering to further reduce spurious motion vectors. We use interpolation to fill in the motion vector information for intra-coded macro-blocks for which there are no motion vector.

A global motion model can be fitted to the blocks to further reduce spurious motion vectors. However, this would also affect motion of foreground objects. However, if the application permits, then global motion fitting, especially through iterated weighted least squares, can increase the reliability of the motion vector field. Model fitting also eliminates the problem of intra-coded macro-blocks. In the context of tracking moving objects according to the human visual system, it makes sense to treat moving objects differently than the mainly static background.

For I-frames of an MPEG compressed video, there are DCT coefficients but no motion vectors. Similarly, for P-frames, there are motion vectors and the DCT coefficients are only for motion residue. We can determined the DCT coefficients of P-frame blocks by applying motion compensation or estimate without decoding. An alternative solution considers the motion vectors from the I-frame to the following P-frame or other frames as the motion of blocks on a non-regular grid in the I-frame. Then, we can interpolate the motion vector field or fit a parametric model to obtain the motion vectors for the blocks of the I-frame. This is an easier and faster approach. However, foreground object motion can be lost if a parametric model is fit to an irregular motion field.

Spatio-temporal Complexity of a Video Segment

We define both a histogram-based measure and a single number measure for the visual complexity of a portion of a video. For each macro-block, we determine the spatio-temporal complexity contribution ($\omega_1$ and $\omega_2$) for each DCT coefficient, and construct a histogram of the complexity distribution. We determine the complexity histogram for the frame by averaging the macro-block complexity histograms. The averaging can be performed over a number of frames to determine a complexity of a video segment.

The spatio-temporal complexity histogram enables us to measure the energy that lies above a given temporal frequency. This measure is used to adjust the summarization factor or play speed for each video frame or segment so that the perceived quality is constant over all frames of the video.

For some application where the histogram is too complex, a more compact measure can be used. For example, an average or a certain percentile can be used as a single representative measure for the spatio-temporal complexity of a video segment. The spatio-temporal complexity histogram is analogous to a power spectrum, while a single number is similar to a bandwidth measure.

In fact, the visual complexity measure is an approximation of the temporal bandwidth of a video segment. Ideally, the temporal bandwidth could be determined by a 3D fast Fourier transform (FFT) or DCT. However, for most videos this would be impractical due to the computational complexity and the buffer requirements. The piece-wise linear motion assumption in using motion vectors enables us to estimate the temporal bandwidth in the compressed video in a straightforward manner.

The estimated temporal bandwidth in the form of a spatio-temporal complexity measure can be higher than a highest possible frequency given the temporal sampling rate. This is due to a number of factors, such as the inherent error in motion vectors, the low resolution of the block-based motion vector field, the motion residuals of the blocks, the linear motion assumption over a number of frames, and so forth. etc.

Figure 11:
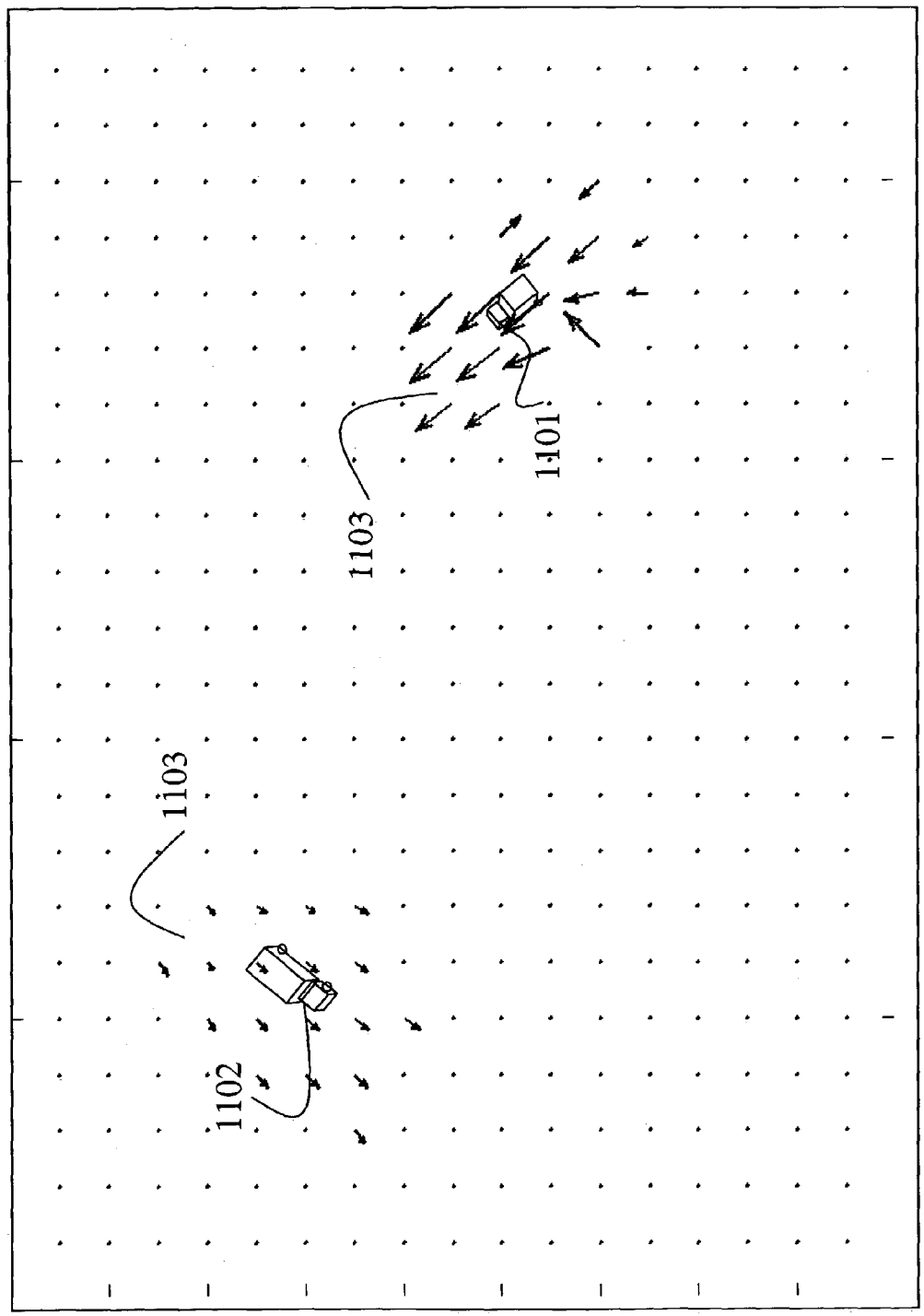
FIG. 11 is diagram of moving vectors for moving objects.

For example, as exaggerated in FIG. 11, for a small object such as a speeding car 1101 or truck 1102 in a long distance surveillance video, the pixel movements, motion vectors 1103, can be larger than the size of the object. Indeed, the spatio-temporal complexity in such an area can be as high as 1.6 for some macro-blocks, where 0.5 is the temporal aliasing limit. However, the spatio-temporal complexity is still a good approximation and an intuitive indicator of the visual scene complexity because it combines two important visual complexity components, the spatial detail and the motion activity level of a video frame.

Adaptive Playback

Under the right conditions, the human visual system can perceive spatial resolutions up to about 60 cycles/degree. However, this number varies by luminance, contrast and foveal location of the stimuli. Watson et. al. report spatial resolution limits of 6 to 17 cycles/degree, which reflects imperfect lighting and contrast that is more likely to be found in videos of ordinary scenes, outside of controlled or studio settings. The temporal frequency limit reported under the same conditions is around 30 Hz, which is comparable to movie and television frame rates of 24 and 25 or 30 fps. The recommended horizontal viewing angle is about 10° for standard resolution TV and 30° for HDTV.

Figure 12:
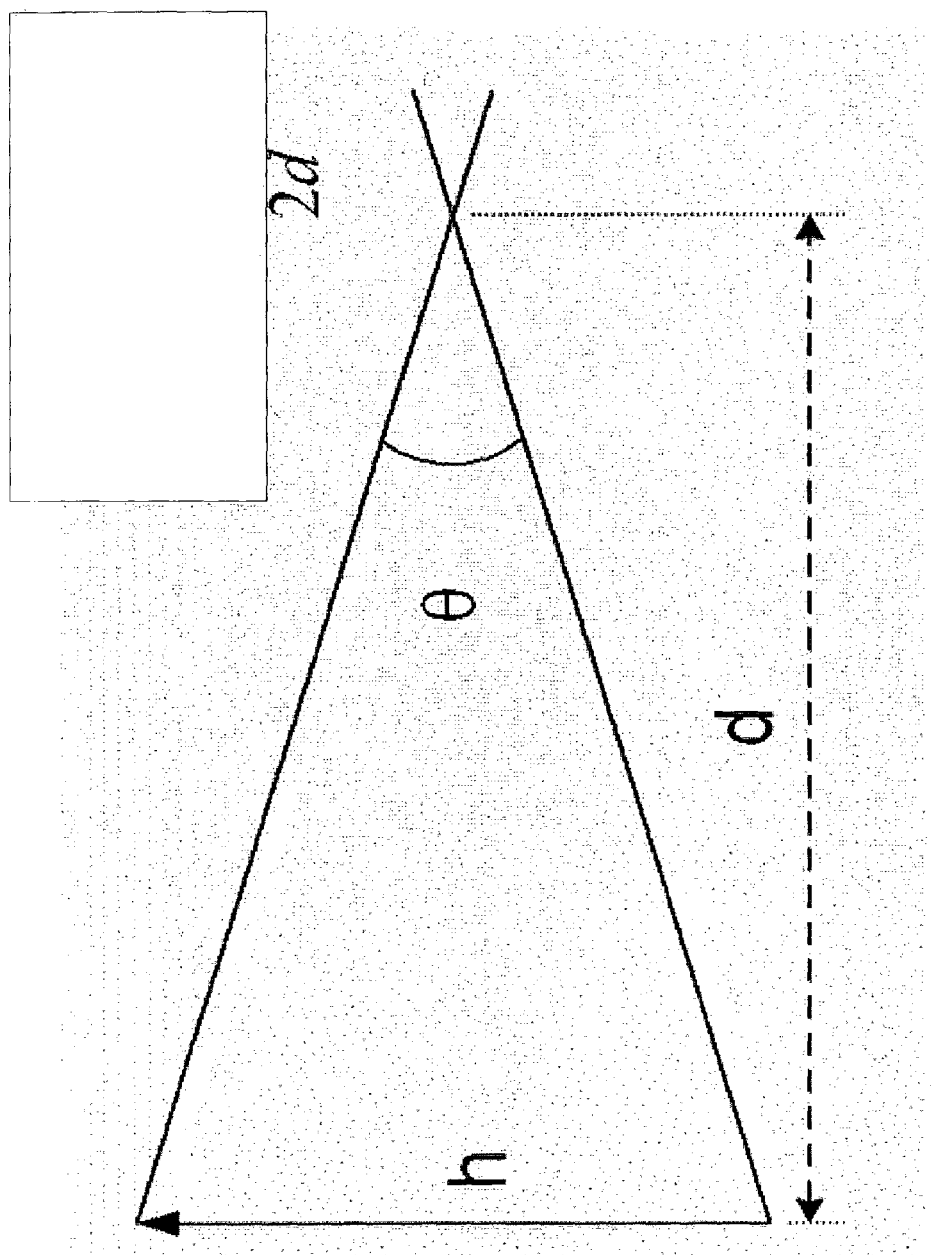
FIG. 12 is a diagram comparing a relationship of angular and distance viewing units.

As shown in FIG. 12, this corresponds to viewing distances, d, of 8 and 3 screen heights, h, respectively, such that $$\theta = 2\tan^{-1}\frac{h}{2d}$$

for the purpose of converting between angular and distance units for resolution computations.

Because the horizontal screen resolutions are 720 (360 cycles) and 1920 (960 cycles), respectively, we have spatial resolutions around 30 cycles/degree. The VCD format has horizontal and vertical resolutions, e.g., at 352×240 NTSC MPEG-1, that are almost half that of the DVD, e.g., at 720×480 NTSC MPEG-2, and is accepted as close to VHS quality. We will take 30 cycles/degree as the high-quality spatial resolution limit (DVD), 15 cycles/degree as acceptable quality resolution (VHS) and 7 cycles/degree as low-end acceptable resolution.

We take the original frame rate of the video as the visual temporal frequency limit $\omega_1$ because this rate is close enough to the estimated real value, and is determined considering the human visual system. Also, it defines the highest temporal frequency in the original content. Under this condition, a highest temporal frequency allowed by the window of visibility constraint is equal to the Nyquist frequency for the original frame rate. For example, a DCT block that has significant energy at one of the (8, n) or (m, 8) coefficients can have only 1 pixel/frame motion in that direction. In general, $$\omega_1 \leq \frac{1}{2} \text{ and } \omega_2 \leq \frac{1}{2},$$

hence, $$|k_x v_x \pm k_y v_y| \leq 8,$$

where $(k_x, k_y)$, $1 \leq k_x, k_y \leq 8$, is the DCT coefficient number.

This can be interpreted as an available spatial bandwidth, given the block motion. As a result, when the speed of playing is increased, the motion vectors are scaled up and the allowed spatial bandwidth shrinks proportionally. Given the spatio-temporal complexity of a video segment, the maximum speed-up factor that can be used to play a video before temporal aliasing is perceived is $$f \leq \frac{1}{2\omega},$$

where ω: spatio-temporal complexity.

As described above, the original spatio-temporal complexity value is sometime above the aliasing limit, as shown in FIG. 11. Although, the overall object can still be seen, the video needs to be played at a slower speed before details can be discerned. In real life, this corresponds to the eyes tracking a fast moving object, which decreases the effective speed and increases the allowed spatial resolution at a given speed.

In cases where a video is played at a speed higher than indicated by the spatio-temporal complexity, spatio-temporal filtering or motion blur can be applied to avoid aliasing. In this lossy case, the spatio-temporal complexity histogram allows us to determine the amount of energy that has to be filtered for a given play speed. Then, the various parts of the video can be speeded up so as to have the same level of loss throughout the entire video. If the simpler, single number spatio-temporal complexity measure is used, video segments are speeded up inversely proportional to their spatio-temporal complexity values.

Spatio-temporal smoothing is a filtering operation in 3D space including spatial and temporal dimensions. Temporal filtering is achieved by a weighted average of buffered frames in the MPEG decoder. The temporal filtering removes a part of the video signal that lies outside the window of visibility, which in our case is equivalent to the temporal aliasing limits. Because the temporal bandwidth of the video segment is the product of the spatial bandwidth and the motion, we can reduce the temporal bandwidth by spatial filtering as well as temporal smoothing.

Techniques like coring allow for efficient spatial filtering of compressed videos. Coring is a well-known technique for removing noise from images. The technique transforms a noise-degraded image into a frequency-domain representation. This is followed by reducing the image transform coefficients by a non-linear coring function. After an inverse transforming on the cored coefficients, the noise-reduced image is obtained. However, in applications that require low complexity, the unfiltered video can be used even though it includes some artifacts.

Another application dependent modification that can be employed is the smoothing and/or quantization of the spatio-temporal complexity curve for the video sequence. In certain cases, a continuous change of the play speed is not feasible or desirable. In those applications, the play speed can be determined for a given minimum length of time, e.g., for each shot. Furthermore, the allowed play speed can be limited to a set of predetermined values as those possible with commercial video and DVD players.

Thus, during playback the temporal distortion of the video can be minimized by using a quantization of the visual complexity, by smoothing and filtering of the visual complexity, by a piece-wise linear approximation of the visual complexity so that the visual complexity is substantially linear, or by assigning a constant visual complexity to a consistent temporal segment of the video, e.g., a shot.

Figure 13:
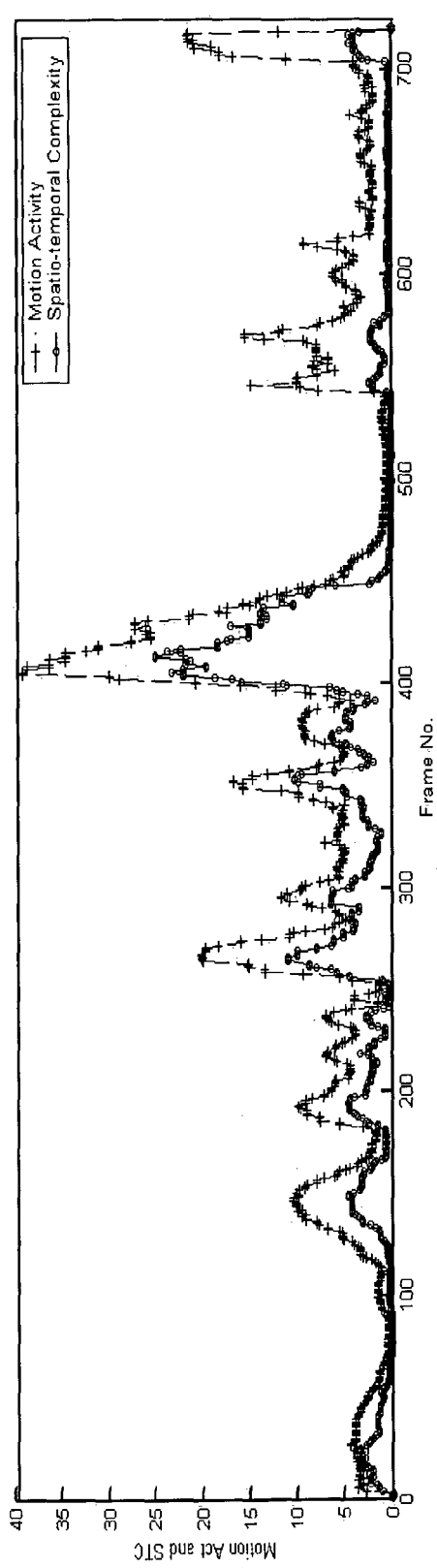
FIG. 13 is a diagram comparing motion activity and visual complexity for a basketball video.
Figure 14:
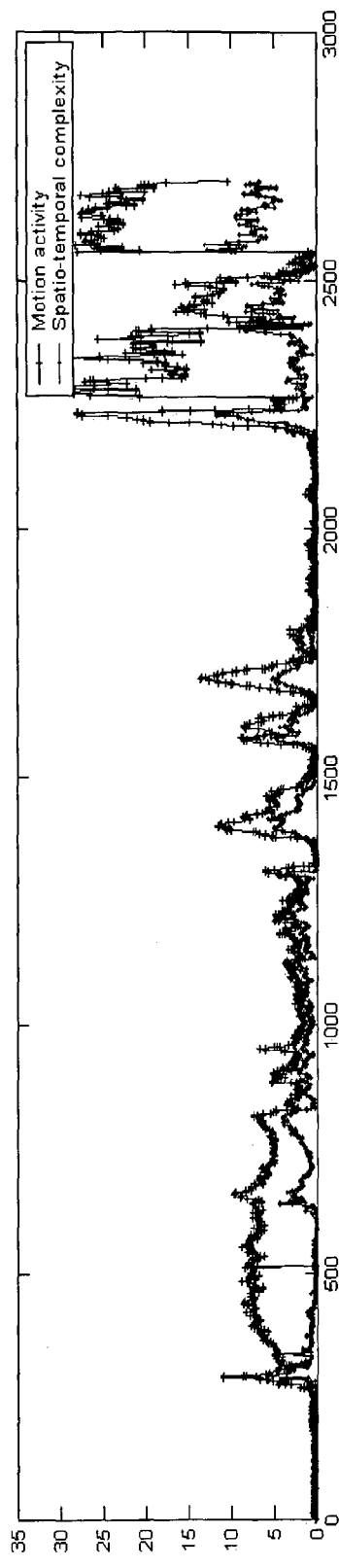
FIG. 14 is a diagram comparing motion activity and visual complexity for a golf video.

FIGS. 13 and 14 further illustrate the difference between the prior art motion activity measure and the spatio-temporal complexity measure according to the invention. FIG. 13 plots the motion activity and spatial-temporal complexity (STC) as a function of frames for a basketball video segment in the MPEG7 test set. The two measures are similar except the last part, ≈frame 550, which is a close up on a player. Here, the spatio-temporal complexity measure is substantially lower because the images are larger with less detail compared to wide angle shots of all of the players. FIG. 14 plots a shot of an empty golf fairway, followed by a tee shot, and players walking to the next green.

Although the preferred embodiment is described with respect to a compressed video, it should be understood that the invention can also be applied to an uncompressed video as follows.

Although the invention is described with examples drawn from the compressed domain, it should be understood that the invention can also work with uncompressed videos.

The basic idea of the invention is to use a measure of spatio-temporal complexity of a video to control an adaptive playback of the video. The spatio-temporal complexity can be approximated by multiplying the bandwidth (spatial) by the velocity (temporal). In particular, the bandwidth in the spatial domain is measured in 2D real images with translation of pure sinusoids.

The top level concept of the invention measures the spatial bandwidth and the temporal bandwidths or spectrum. When the video is speeded up or slowed down, the temporal frequency components scale up or down proportionally. This is true even if the video is not sampled in time or space, e.g., NTSC analog video. The spatial bandwidth can be measured in a number of ways, e.g., by taking the 3D FFT of a given video segment, or the analog Fourier transform when the video is analog. The temporal bandwidth can be estimated by taking the dot-product of spatial frequency components and their velocities.

This is an intuitive, empirical measure in itself, which combines the spatial complexity, i.e., level of texture, with motion complexity, i.e., level of motion activity. Note that, the video can be compressed or uncompressed, or digital or analog. This dot-product is the spatio-temporal complexity of a given video segment. Although the visual complexity of the video includes both the spatial and the temporal bandwidth, the temporal bandwidth is the determining factor in adaptive playback of digital video. For the above approximation to be used, we identify the individual motion of the spatial frequency components, i.e., pure sinusoids in 2D, which make up the video image. If the whole scene in the images of the video is moving uniformly as in camera panning on a distant shot, i.e., translational motion, all the spatial frequency components move at the same velocity v. Then, the image can be decomposed into those components by using a 2D FFT.

The temporal frequency components resulting from the motion can be determined of each spatial component by using the dot-product estimation. However, the motion in scenes of most videos is usually much more complicated than a simple pan. Therefore, the invention uses macroblock motion vectors in the compressed domain.

A single translational motion is defined for each macroblock as expressed in the block motion vectors. Hence, each spatial frequency component making up a specific macroblock is moving with a velocity given by the block motion vector associated with that block.

We estimate the temporal frequency component resulting from the motion of each spatial frequency component in that block, using the dot-product. Furthermore, we obtain the spatial frequency components, normally obtained through an FFT, using the DCT coefficients available in compressed video.

But, following the velocity*spatial frequency approximation in a localized region approach, we can determine the motion and spatial decomposition at each pixel in the image, or more generally, for a window around each pixel.

The temporal bandwidth (motion) at each point can be determined through optical flow analysis. For the spatial bandwidth, we can use a window around each pixel and compute a short-time FFT, and the like. Then, we can determine the spatio-temporal complexity at each pixel or pixel neighborhood, using the window.

The compressed video example we describe is a special case where the window is the macroblock, and the motion is described by block motion vectors.

The amount of texture at a pixel is closely related to the gradient of the intensity at that pixel. The optical flow can also be determined from the gradient.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for playing frames of a video adaptively, comprising the steps of:
    measuring a spatial frequency of pixel within frames of the video, wherein the spatial frequency is measured from discrete cosine transform coefficients of the pixels in the frames, and wherein basis functions of the discrete cosine transformation are in a form $$\cos\left(\frac{\pi k_x(2x+1)}{2N}\right) \cdot \cos\left(\frac{\pi k_y(2y+1)}{2N}\right) = \cos\left(2\pi \frac{k_x}{2N}x + 2\pi \frac{k}{4N}\right) \cdot \cos\left(2\pi \frac{k_y}{2N}y + 2\pi \frac{k}{4N}\right),$$

where $k_x$ is a frequency $f_x$ in an x direction and $k_y$ is a frequency $f_y$ in a y direction in the frame represented as $$\cos\left(2\pi \frac{f_x}{N}x + 2\pi \frac{f_y}{N}y\right),$$

where N is 8 for DCT macro-blocks, and each DCT basis is a superimposition of two two dimensional sinusoids;
    measuring a temporal velocity of corresponding pixels between frames of the video, wherein the temporal velocity is measured from motion vectors of corresponding pixels between the frames;
    multiplying the spatial frequency by the temporal velocity to obtain a measure of visual complexity of the frames of the video; and
    playing the frames of the video at a frame rate that corresponds to the measure of visual complexity.

2. The method of claim 1 wherein the video is compressed.

3. The method of claim 1 wherein each basis function is a superimposition of two 2D sinusoids, one with a spatial frequency $$\vec{f}_1 = \left(\frac{k_x}{2}, \frac{k_y}{2}\right)$$

and another with a spatial frequency $$\vec{f}_2 = \left(\frac{k_x}{2}, \frac{k_y}{2}\right).$$

4. The method of claim 3 wherein a particular motion vector is $\vec{v} = (v_x, v_y)$.

5. The method of claim 4 wherein the visual complexity resulting from the discrete cosine coefficient and the motion vectors are $$\omega_1 = \vec{f}_1 \cdot \vec{v}_1 = \frac{k_x}{2}v_x + \frac{k_y}{2}v_y, \text{ and}$$

$$\omega_2 = \vec{f}_2 \cdot \vec{v}_2 = \frac{k_x}{2}v_x - \frac{k_y}{2}v_y.$$

6. The method of claim 1 further comprising:
    discarding motion vectors with a low texture;
    median filtering the motion vectors; and
    fitting a global motion model to the motion vectors to reduce spurious motion vectors.

7. The method of claim 1 wherein the compressed video includes I-frames and P-frames, and further comprising:
    determined discrete cosine transformation coefficients of the P-frames by applying motion compensation; and
    determining motion vectors for the I-frames by interpolating the motion vectors of the P-frames.

8. The method of claim 1 further comprising:
averaging the visual complexity over a set of frames to determine a complexity of a video segment.

9. The method of claim 1 further comprising:
applying motion blur while playing the video to reduce aliasing.

10. The method of claim 1 wherein the frame rate of playing is inversely proportional to the visual complexity.

11. The method of claim 1 further comprising:
applying coring to spatial filter the video while playing.

12. The method of claim 1 wherein the video is uncompressed.

13. The method of claim 1, in which a temporal distortion of the video is minimized during playback.

14. The method of claim 13, in which the minimizing uses a quantization of the visual complexity.

15. The method of claim 13, in which the minimizing uses a smoothing and filtering of the visual complexity.

16. The method of claim 13, in which the minimizing constructs a piece-wise linear approximation of the visual complexity so that the visual complexity is substantially linear.

17. The method of claim 13, in which the minimizing assigns a constant visual complexity to a consistent temporal segment of the video.

* * * * *